G. H. SPEAR.
TRANSFER MECHANISM.
APPLICATION FILED JAN. 27, 1913.

1,253,640.

Patented Jan. 15, 1918.
6 SHEETS—SHEET 1.

Witnesses:
Horace A. Crosman
Carl L. Choate.

Inventor:
George H. Spear.
by Emery, Booth, Janney & Varney
Attys.

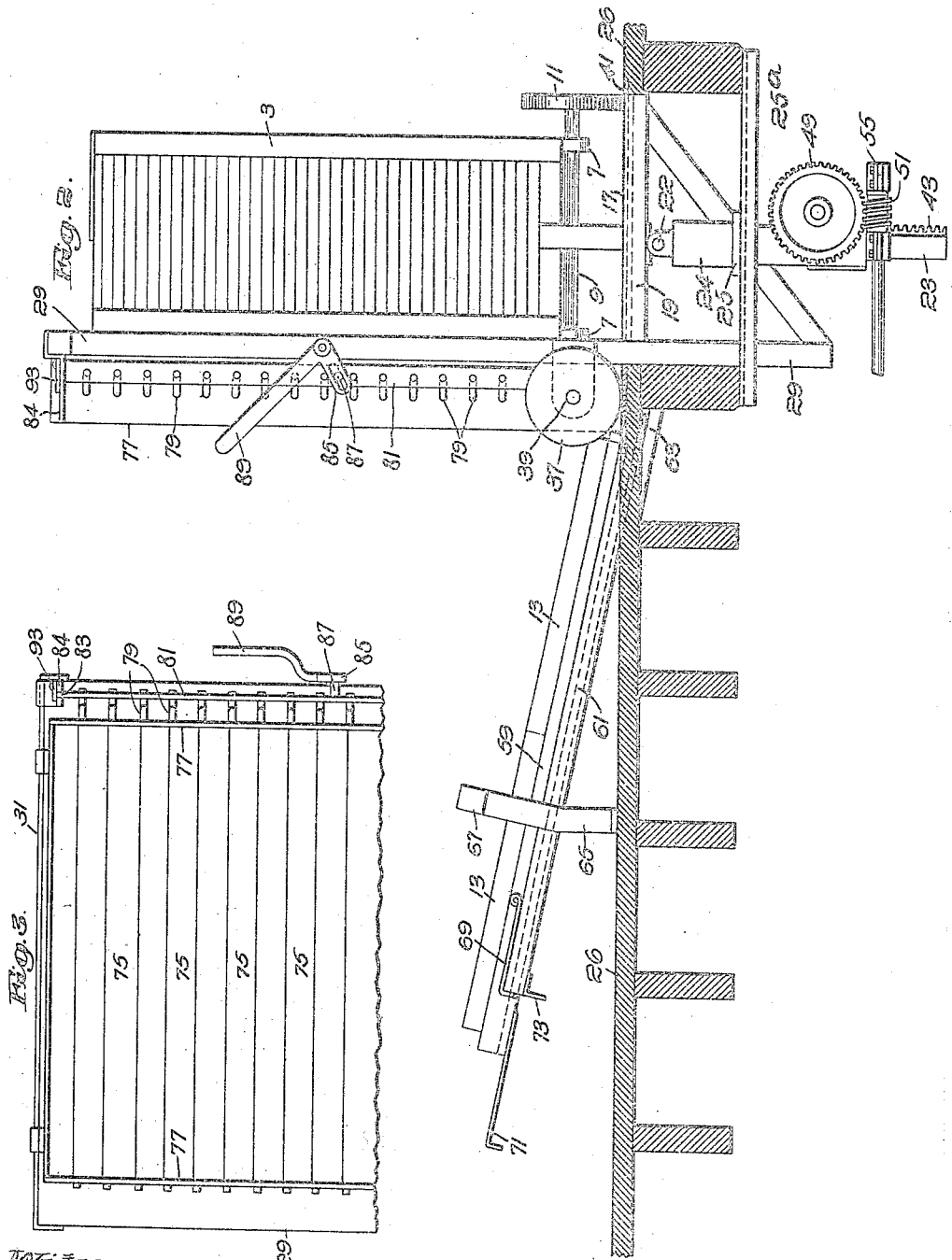

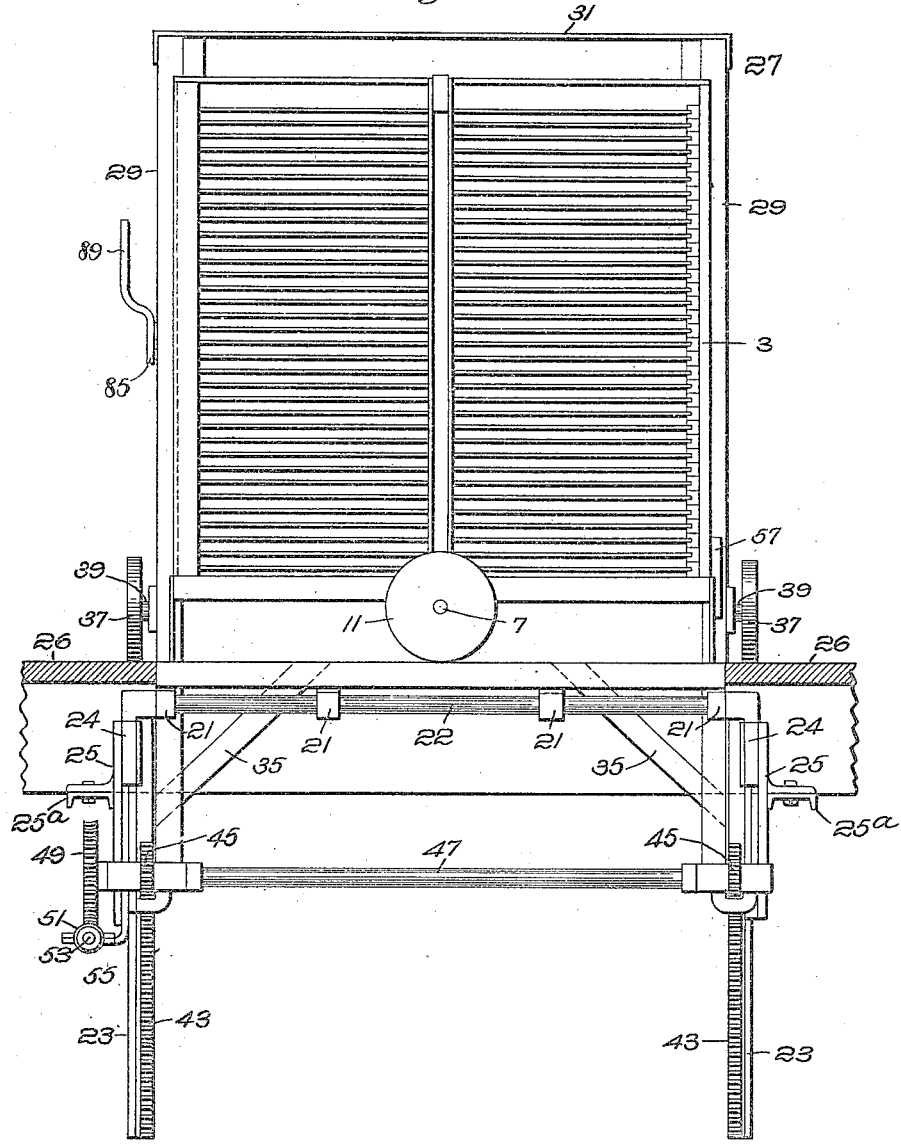

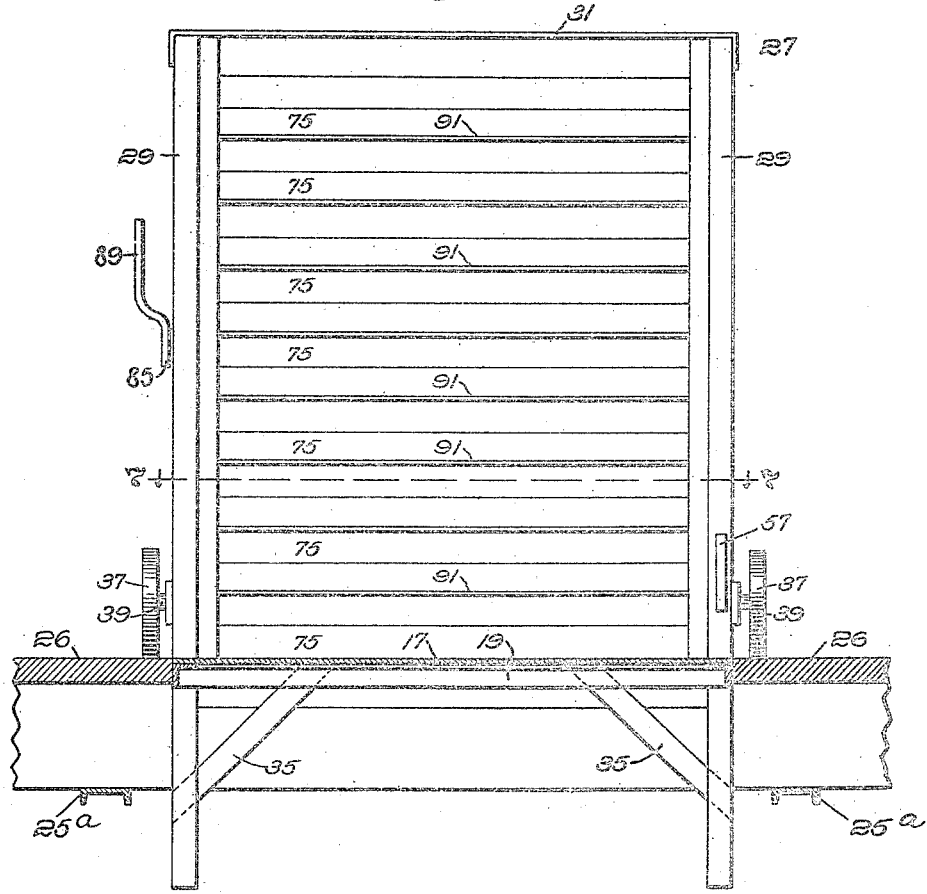
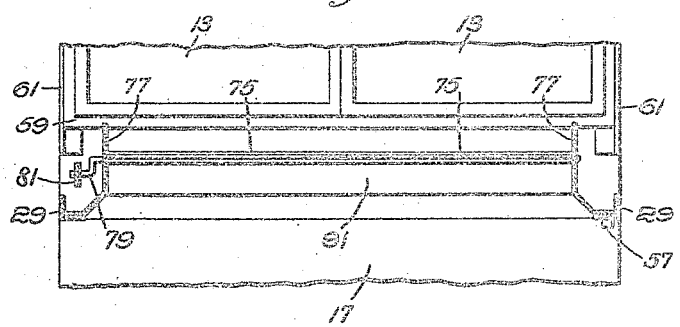

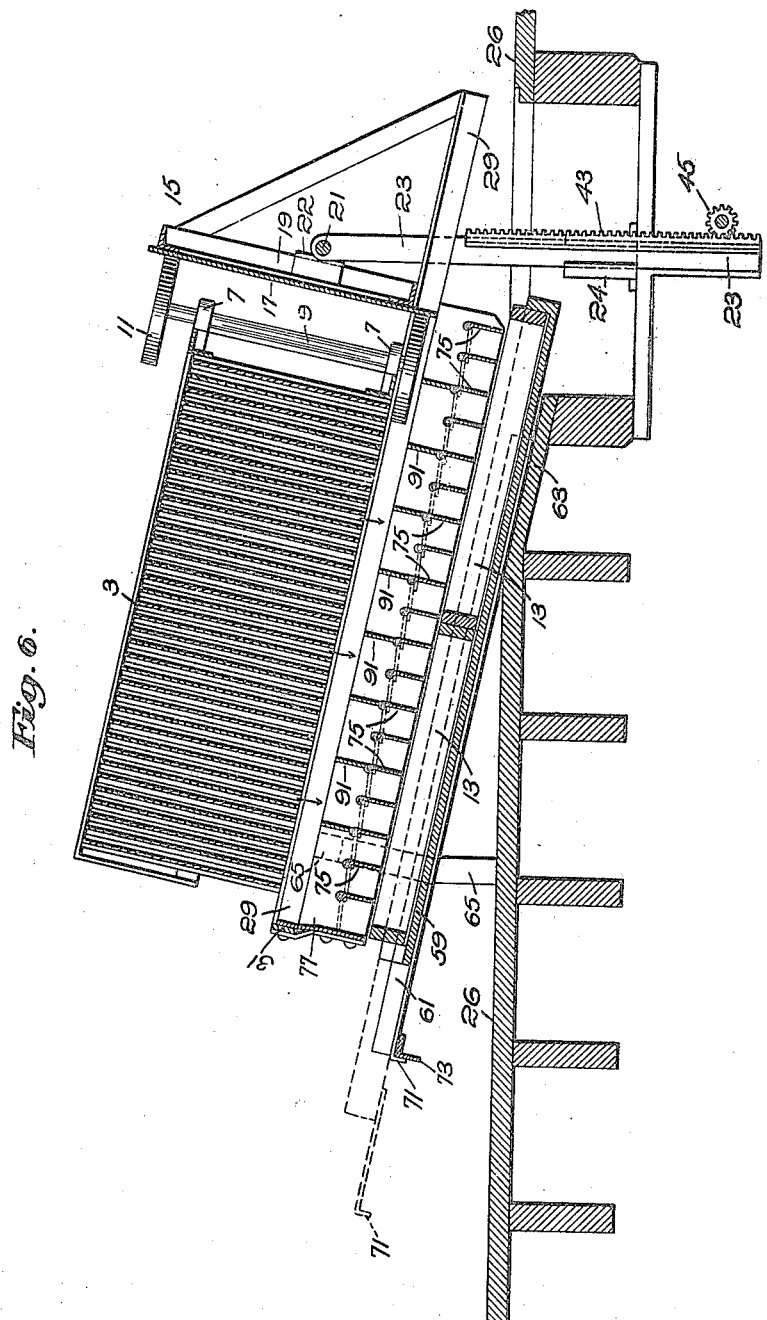

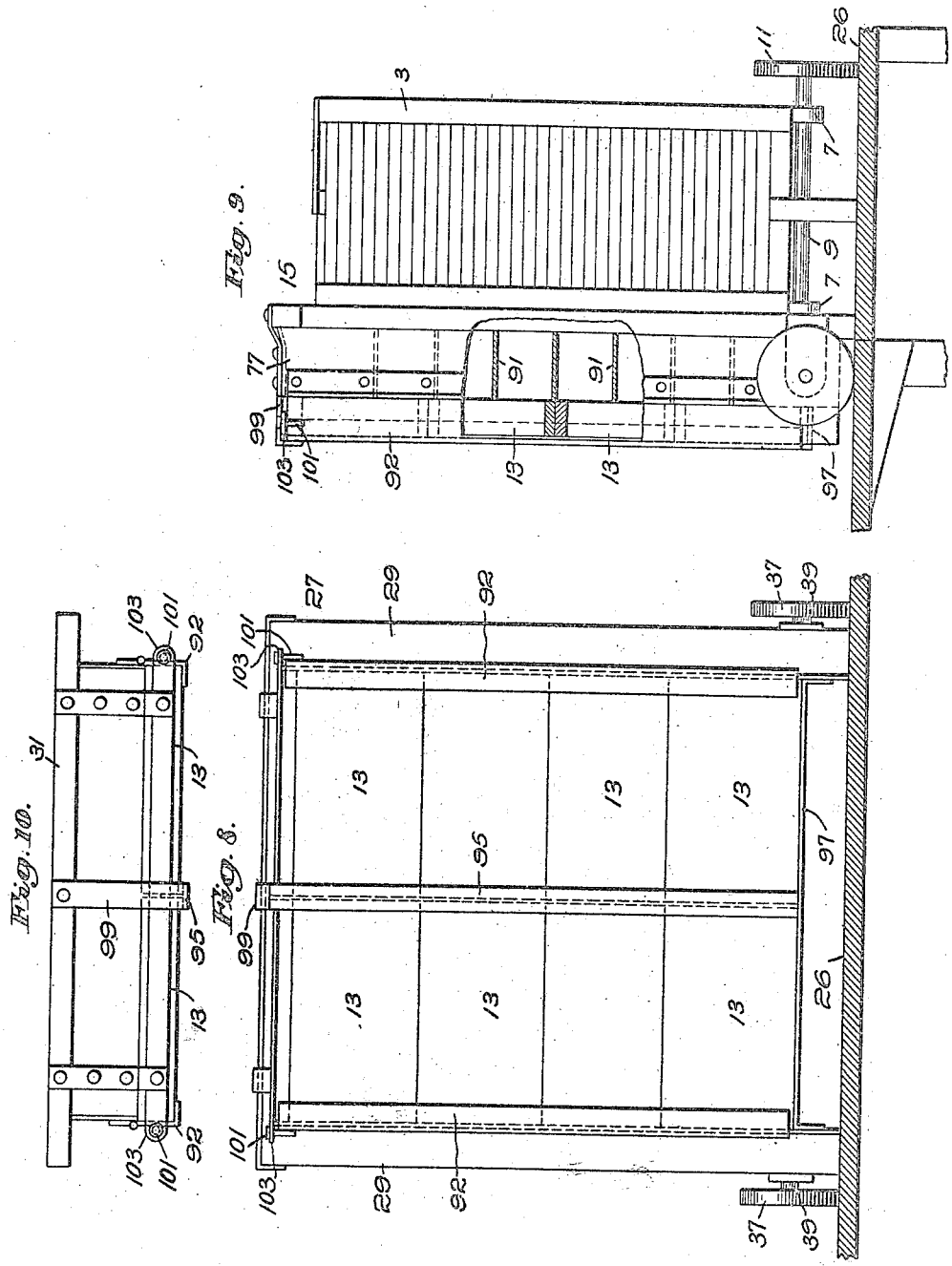

UNITED STATES PATENT OFFICE.

GEORGE H. SPEAR, OF NORTH READING, MASSACHUSETTS, ASSIGNOR, BY MESNE ASSIGNMENTS, TO NEW ENGLAND CONFECTIONERY COMPANY, OF BOSTON, MASSACHUSETTS, A CORPORATION OF MASSACHUSETTS.

TRANSFER MECHANISM.

1,253,640.            Specification of Letters Patent.      Patented Jan. 15, 1918.

Application filed January 27, 1913. Serial No. 744,415.

*To all whom it may concern:*

Be it known that I, GEORGE H. SPEAR, a citizen of the United States, and resident of North Reading, in the county of Middlesex and Commonwealth of Massachusetts, have invented an Improvement in Transfer Mechanisms, of which the following description, in connection with the accompanying drawings, is a specification, like characters on the drawings representing like parts.

This invention relates to bakers' and confectioners' apparatus, and more particularly to apparatus for transferring wafers or other articles from one receiver to another.

The character of the invention may be best understood by reference to the following description of an illustrative embodiment thereof shown in the accompanying drawings, wherein:

Fig. 2 is a side elevation of the apparatus shown in Fig. 1;

Fig. 3 is a partial end elevation of the apparatus shown in Fig. 2, looking toward the right of the figure;

Fig. 4 is an end elevation of the apparatus shown in Fig. 2, looking toward the left of said figure;

Fig. 5 is a view similar to Fig. 4, with the conveyance removed;

Fig. 6 is a side elevation similar to Fig. 2, showing the parts in a different position;

Fig. 7 is a transverse section taken on line 7—7 of Fig. 5;

Fig. 8 is an end elevation of a modification of the apparatus;

Fig. 9 is a side elevation of the apparatus shown in Fig. 8; and

Fig. 10 is a plan of the apparatus shown in Fig. 8.

Figure 1:
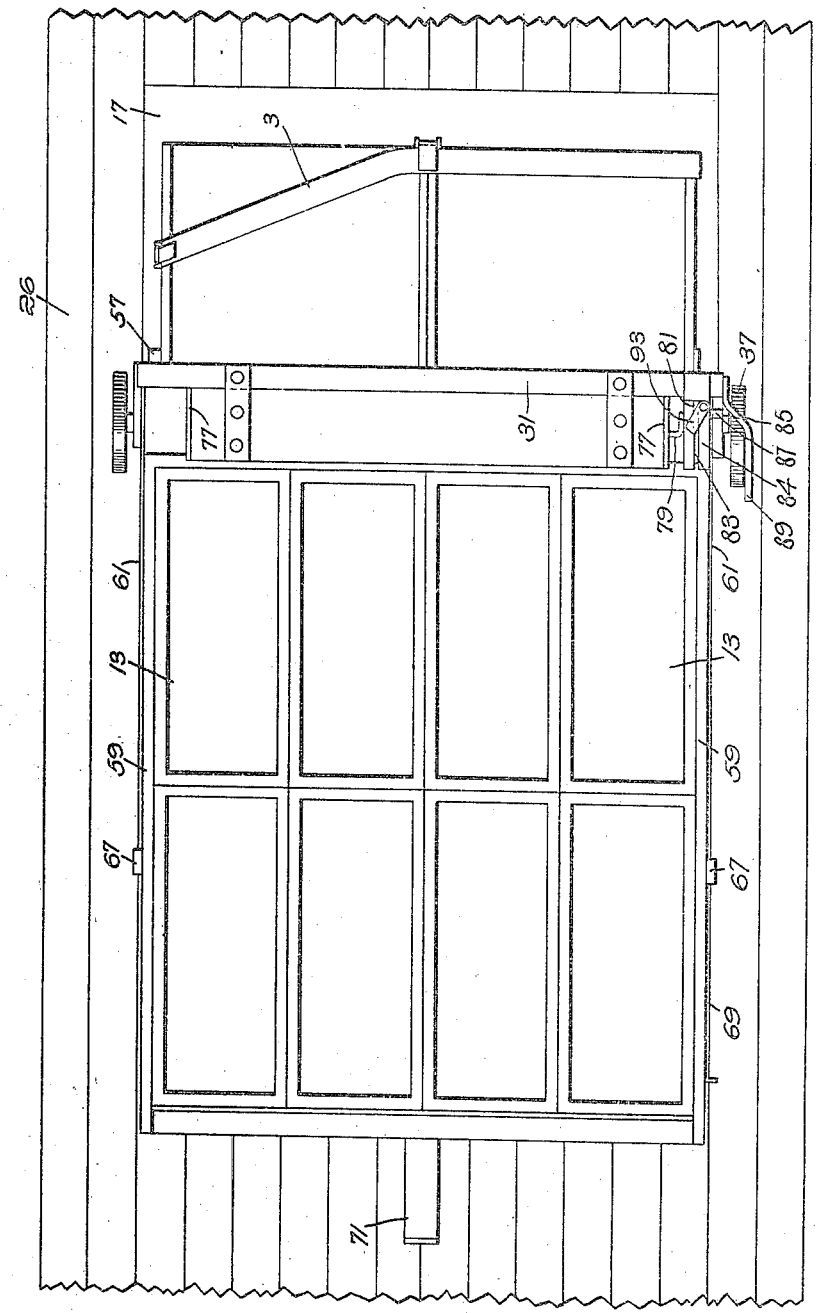
Figure 1 is a plan view of an illustrative apparatus shown herein as embodying the invention, with a conveyance thereon.

In the manufacture of wafers it is customary to dry them on boards or shallow trays, there being of course but one layer of wafers on a tray. After the wafers are dried a large number of these trays are piled on a truck for conveying them to another part of the factory, where the goods are discharged from the truck.

In the drawing is shown such a truck comprising a base 1 on which is mounted a frame 3 for receiving two piles of trays 5, such as referred to. Journaled in bearings 7 preferably centrally under the truck is a shaft 9 on which are mounted wheels 11 permitting the truck to be readily moved from place to place.

Before the wafers are packaged they are transferred to and collected in trays 13 or other suitable receiving means or receptacle. A small number of collecting trays have a capacity sufficient to receive the contents of a large number of the shallow trays carried by the truck. For example, eight trays can receive the contents of over seventy of the truck trays.

Heretofore in transferring the wafers from the truck trays to the collecting trays it has been necessary for an operative to lift manually the trays individually or in small groups successively from the truck and dump their contents into the collecting trays. Usually the cakes have a tendency to stick to the trays, making it necessary for the operative to jar the trays by knocking them against his knee as he tips them to discharge their contents. This manual transferring of the product is a slow, inconvenient process and frequently results in breaking and mutilating the product.

An object of the invention is to provide an apparatus whereby the wafers may be readily and expeditiously transferred from an assembly of the truck trays to the collecting trays without injury to the product.

To this end there may be provided transfer means for bodily manipulating or tilting the truck, together with its trays as a unit, to deposit the contents of the latter into the collecting trays. This means is illustrated herein as a carrier 15 comprising a platform plate or base 17 on an angle iron frame 19, said platform being provided on its under face with bearings 21 depending therefrom and receiving a shaft 22 connected to slide bars 23 adapted to reciprocate vertically in guide ways 24 on brackets 25 fixed to channel bars 25ᵃ on suitable floor beams, said guide ways being located in recesses at the ends of an opening in a flooring or other support 26, said opening being of a size sufficient to receive and conform to the platform 17.

The platform is provided adjacent one edge thereof with an upright or frame 27, conveniently of spaced angle bars 29 secured to the platform bars 19, and connected at their upper ends by a horizontal bar 31. Their lower ends are projected beneath the platform 17 and connected thereto by diagonal stay bars 33 and 35. By this construction the upright is rigidly maintained perpendicularly to the platform.

To contribute to the support of the platform 17 and facilitate the tilting thereof, as more fully hereinafter described, the upright 27 is provided with wheels 37 on a shaft 39 journaled in bearings carried by said upright. An edge of the platform may rest on a ledge 41 in an edge of the floor receiving opening.

Suitable means may be provided for tilting the truck carrier. This means, as shown herein, comprises racks 43 (Figs. 2 and 4) on edges of the platform slide bars 23, said racks being reciprocated vertically by pinions 45 fast on a shaft 47 journaled in bearings carried by the brackets 25, referred to. To rotate the shaft 47 it is provided at one end with a worm wheel 49 adapted to be turned by a worm 51 on a shaft 53 journaled in bearings in brackets 55 also carried by said brackets 25. The worm shaft may be rotated manually or by power, as desired.

By means of the construction described the truck carrier may be readily tilted as desired, and will be held in any position to which it may be adjusted by virtue of the well known locking action of a worm wheel with its worm.

A truck loaded with trays containing the product may be wheeled readily from the floor on to the platform 17 and be placed with one of its sides abutting against the upright 27. The position of the truck relative to the upright may be determined by the engagement of the end of the truck with a stop 57 (Fig. 1) projecting laterally from said upright. When the truck thus is mounted on the carrier it may receive support from both the upright and the platform of the carrier. When the truck is in this position the edges of the pile of trays rest against said upright. As a result, when the carrier is tilted to rock the truck from its vertical position (Fig. 2) to its inclined position (Fig. 6) the trays will not be dislocated. In the latter position the articles contained on the trays will be discharged therefrom. While it is convenient to hold the pile of trays in their assembled superposed relation by resting their edges against the upright of the carrier, any suitable means may be employed for holding the trays in their assembled relation.

To receive the product, trays such as the trays 13, or other appropriate means, may be provided. These trays may be supported conveniently on the floor adjacent the carrier by a table 59 (Figs. 2 and 6) mounted on angle iron slide ways 61 having their lower end portions secured upon an incline 63 in the floor leading to the platform receiving openings. The slide ways may be supported further by brackets 65 secured thereto and projecting upwardly to constitute rests or stays 67 for engagement with the carrier to limit the rocking thereof, as more fully hereinafter described.

When the carrier is tilted to the position shown in Fig. 6 its product will gravitate and slide therefrom into the trays 13 mounted on the inclined table 59.

To prevent interference with the tilting movement of the carrier by the table, the latter should be moved up on its slide ways 61 to the position shown in Fig. 2. To hold the table in this position it may be provided with a hook 69 for engagement with one of the slide ways. After the carrier has been tilted down the table is slid down to its position shown in Fig. 6, thereby bringing the trays in proper registration with the upright. The table may be held in this position by a hook 71 for engagement with a cross piece 73 connecting the slides 61.

To prevent the discharge of the truck tray contents to the collecting trays until after the truck has been tilted to its position shown in Fig. 6, the upright 27 may be provided with controlling means, typified herein as a shutter composed of a series of leaves 75 (Figs. 2 and 3) on rods pivoted in the end members of a frame 77 projecting laterally from and suitably secured to the upright 27. To permit the simultaneous opening and closing of these leaves the rods carrying the same are extended beyond said frame and bent to provide bell cranks 79 (Fig. 2) having their free ends pivotally connected to an operating bar 81 adapted to reciprocate vertically in an elongated slot 83 (Fig. 1) in a bracket 84 projecting from the upper end of the upright 27.

To slide the shutter operating bar 81 in its slots there may be provided a crank 85 pivoted on one of the upright angle bars 29 and having an elongated slot receiving a pin 87 projecting from the operating bar 81. The crank 85 may be rocked by a handle 89 fast thereto. This handle may be rocked to slide the operating bar 81 vertically and laterally to open or close the shutter leaves as desired.

To guide and facilitate the distribution of the product from the truck trays to the collecting trays the shutter receiving frame may be provided with partitions 91 (Fig. 6) distributed at appropriate intervals therein.

To secure the shutter in its closed position there is provided a lock stop 93 (Fig. 1) pivoted on the bracket 84 receiving the operating bar 81 and adapted to be rocked to overlie the upper end of said bar or be rocked out of engagement with said bar to permit the free reciprocation thereof.

In operation the collecting trays 13 are placed on the table 59, which is slid outwardly from the carrier sufficiently to permit the latter in rocking to clear the same. A truck loaded with trays filled with the product is then rolled on the carrier platform 17 until its end engages the stop 57 and its side rests and fits against the upright 27. The worm shaft is then rotated and through the worm, worm wheel, pinions and racks, moves the platform slides 23 upwardly. This causes the carrier to tilt in a contra-clockwise direction toward and to the trays 13 until the carrier upright is limited by its engagement with the stops 67.

In the course of this operation the truck is tilted so that its side rests upon and is supported principally by the carrier upright. The tray receiver is then slid down into registration with the shutter frame 77. The shutter lock 93 is then released and the shutter operating handle 89 rocked to open the shutter. This permits the product on the truck boards to slide across the partitions 91 through the frame 77 and into the trays 13.

The collecting tray receiver is then pulled upwardly to prevent interference with the return tilting of the carrier to its upright position. The worm shaft is then turned to rock the carrier in a clockwise direction back to its vertical position. The carrier platform is then flush with the level of the floor and the empty truck may be wheeled therefrom and a loaded truck may be wheeled on the platform in its place. The operations just described then may be repeated to transfer the product from the truck and collect the same in the trays 13. The trays carrying the product thus collected then may be moved from the apparatus and be conveyed to the machine for assembling and packaging the product in the usual manner.

As stated, the carrier platform is pivoted to and rocks about the slides 23 as fulcra, but in the course of the rocking movement the pivot centers are moving. As a result, the carrier wheels 37 will roll along the floor and contribute to the support of the carrier in conformity to this movement.

By my invention there is provided a simple and effective mechanism for quickly and conveniently transferring the contents of the multiplicity of boards on a truck to one or a small number of trays.

While trays 13 are shown herein as the means for receiving the contents of the truck, it will be understood that any appropriate receiver may be employed for collecting and conveying the product thus discharged from the truck.

Referring now more particularly to Figs. 8, 9 and 10, there is shown a carrier 15 substantially similar to that described in the other figures with the exception that provision is supplied for securing the collecting trays directly to the upright 27. To this end the frame 77 is equipped with hinged angle clamps 92 extending vertically along the sides of said frame 77. There is also provided a frame member herein in the form of a T bar 95 extending vertically centrally along the frame 77 and connected at its lower end to a horizontal bar 97 secured to the lower end of the frame 77 and at its upper end to a bracket 99 also connected to said frame. By this construction the trays 13 may be readily introduced to the frame 77 and be held thereto by the engagement of their adjacent edges with the flanges of the T bar 95 and by the swinging of the hinged angle clamps 92 over the outer edges of the trays. The hinges may be held in this position by means of pins 101 in end apertures 103 of a horizontal bar secured to the upper end of the frame 77, said pins being adapted to engage the backs of said hinges.

When the trays are clamped directly to the upright frame 77 it is not necessary to employ the discharge controlling shutter 75, referred to, since on the tilting of the carrier, the product carried by the truck trays may slide therefrom across the distributing partitions 91 directly into the trays 13.

After the contents of the truck thus have been deposited into the trays the hinged angle clamps 92 are released from the trays and the latter may rest on a table such as the table 59, referred to, or on any other suitable support. The carrier may then be tilted back to its vertical position in readiness again to discharge its contents into trays secured thereto.

It is to be understood that the invention is not limited to the specific construction, organization and mode of operation above described, but on the contrary, the invention may be used in various combinations and sub-combinations.

What I claim as new and desire to secure by Letters Patent is:

1. An apparatus of the class described comprising, in combination, a support; a carrier thereon having provision for supporting an assembly of trays in superposed relation with edges of the latter free to discharge therefrom; slides connecting said carrier to said support; wheels interposed between said carrier and said support; and means for moving said slides to tilt said carrier to discharge the contents of said trays.

2. An apparatus of the class described comprising, in combination, a carrier having a base and lateral support for receiving an assembly of trays; means for moving said carrier to discharge the contents of said trays; and adjustable means coöperating with said lateral support for permitting or preventing discharge therethrough.

3. An apparatus of the class described comprising, in combination, a carrier having provision for supporting an assembly of trays; means for moving said carrier into receiving and discharging positions; and adjustable means for permitting or preventing the discharge from said carrier when the latter is in discharging position.

4. An apparatus of the class described comprising, in combination, a carrier having a base and a support formed for receiving edges of an assembly of trays; means for actuating said carrier simultaneously to discharge the product from all of said trays; adjustable shutter means for permitting and preventing discharge from said carrier; and means for holding said carrier in different positions.

5. An apparatus of the class described comprising, in combination, a carrier for receiving a conveyance and movable to tilt the conveyance to discharge the contents thereof; adjustable shutter means for controlling the discharge; and means for securing the shutter means in closed position.

6. An apparatus of the class described comprising, in combination, a carrier for receiving a conveyance and movable to tilt the conveyance to discharge the contents thereof; shutter means for permitting and preventing the discharge; and means for controlling the shutter means.

7. An apparatus of the class described comprising, in combination, a carrier having a platform and an upright for receiving a conveyance, said carrier being movable to discharge the contents of said conveyance; and adjustable shutter means coöperating with said upright for permitting and preventing the discharge.

8. An apparatus of the class described comprising, in combination, a carrier comprising a platform and an upright frame for receiving a conveyance; distributing partitions for said frame; means to tilt said carrier to discharge the contents of said conveyance between said partitions and adjustable means for permitting or preventing the discharge.

9. An apparatus of the class described comprising, in combination, a carrier comprising a platform and an upright frame for receiving a conveyance; means to tilt said carrier to discharge the contents of said conveyance through said frame; and means coöperating with said frame for permitting and preventing the discharge therefrom.

10. An apparatus of the class described comprising, in combination, transfer means for a conveyance having provision permitting the same to tilt the conveyance to a discharging position; and a receiver normally interfering with the tilting of said transfer means and having provision permitting the adjustment thereof to permit the tilting of said transfer means.

11. An apparatus of the class described comprising, in combination, transfer means for a conveyance having provision permitting the same to be tilted to discharge the contents of said conveyance; means for receiving the contents of said conveyance normally interfering with the tilting of said transfer means and adjustable to permit the tilting of said transfer means; and means to hold said receiving means in different positions of adjustment.

12. An apparatus of the class described comprising, in combination, means for maintaining a pile of trays in assembled relation; receiving means arranged adjacent edges of said trays; means for manipulating said pile of trays and receiving means as a unit to discharge the contents of said trays into said receiving means; and adjustable means for permitting or preventing the escape of said contents from said receiving means.

In testimony whereof, I have signed my name to this specification, in the presence of two subscribing witnesses.

GEORGE H. SPEAR.

Witnesses:
HENRY T. WILLIAMS,
JOHN R. MOULTON.

Copies of this patent may be obtained for five cents each, by addressing the "Commissioner of Patents, Washington, D. C."